US012138920B2

(12) United States Patent
Karlinski et al.

(10) Patent No.: US 12,138,920 B2
(45) **Date of Patent: *Nov. 12, 2024**

(54) PULSE WAVEFORMS FOR INK JET PRINTING

(71) Applicant: LANDA CORPORATION LTD., Rehovot (IL)

(72) Inventors: Haggai Karlinski, Ramat Gan (IL); Yishai Castel, Kibbutz Netzer Sereni (IL)

(73) Assignee: LANDA CORPORATION, Rehovot (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/295,280

(22) Filed: Apr. 4, 2023

(65) Prior Publication Data

US 2023/0256736 A1 Aug. 17, 2023

Related U.S. Application Data

(60) Division of application No. 17/706,636, filed on Mar. 29, 2022, now Pat. No. 11,648,772, which is a (Continued)

(51) Int. Cl.

*B41J 29/38* (2006.01)
*B41J 2/045* (2006.01)
*B41J 2/21* (2006.01)

(52) U.S. Cl.

CPC ....... *B41J 2/04588* (2013.01); *B41J 2/04586* (2013.01); *B41J 2/2103* (2013.01)

(58) Field of Classification Search

CPC ................ B41J 2/04526; B41J 2/04588; B41J 2/04596; B41J 2/04541

See application file for complete search history.

(56) References Cited

U.S. PATENT DOCUMENTS 9,272,511 B2 * 3/2016 Menzel ................ B41J 2/04526
11,648,772 B2 5/2023 Karlinski et al.

(Continued)

FOREIGN PATENT DOCUMENTS

JP 2011183550 A 9/2011
JP 2013107235 A 6/2013

OTHER PUBLICATIONS

JP2011183550A Machine Translation (by EPO and Google)—published Sep. 22, 2011; Fujifilm Corp.

(Continued)

*Primary Examiner* — Lam S Nguyen
(74) *Attorney, Agent, or Firm* — MEITAR PATENTS LTD.

(57) ABSTRACT

A digital printing system includes a print head and a processor. The print head is configured to jet droplets of ink. The a processor is further configured to translate a required shade of a color, to be printed at a given location on a substrate by the print head, into a sequence of pulses, the sequence including: (a) up to a predefined maximum number of driving pulses that cause the print head to jet respective droplets, and (b) a tickling pulse, which has a smaller amplitude than the driving pulses and which causes the print head to jet a droplet smaller than the droplets jetted in response to the driving pulses. The processor is additionally configured to apply the sequence of pulses to the print head.

15 Claims, 2 Drawing Sheets

Related U.S. Application Data continuation of application No. 17/291,630, filed as application No. PCT/IB2019/056888 on Aug. 14, 2019, now Pat. No. 11,325,377.

(60) Provisional application No. 62/767,533, filed on Nov. 15, 2018.

(56) References Cited

U.S. PATENT DOCUMENTS

| | | | | |
|---|---|---|---|---|
| 2006/0125856 | A1* | 6/2006 | Kitami | B41J 2/04596 347/10 |
| 2007/0146403 | A1* | 6/2007 | Sayama | B41J 2/04588 347/10 |
| 2014/0098147 | A1* | 4/2014 | Endo | B41J 2/04541 347/10 |

OTHER PUBLICATIONS

JP2013107235A Machine Translation (by EPO and Google)—published Jun. 6, 2013; Mimaki Eng Kk.

* cited by examiner

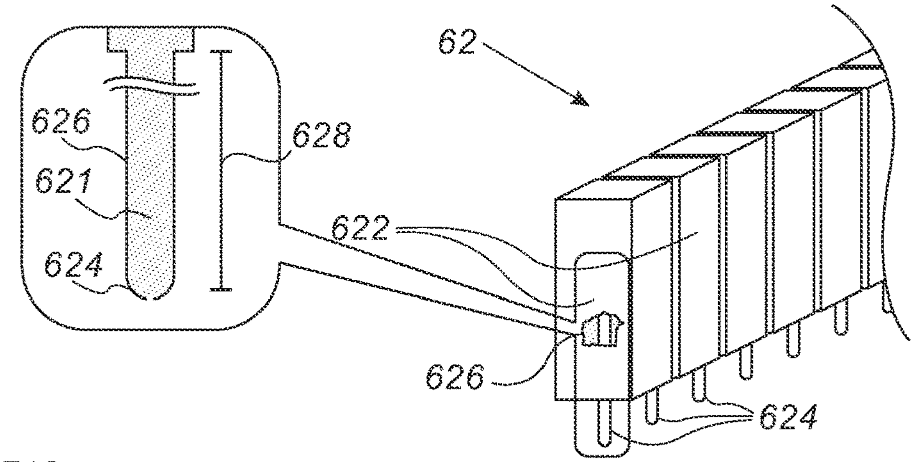
FIG. 2
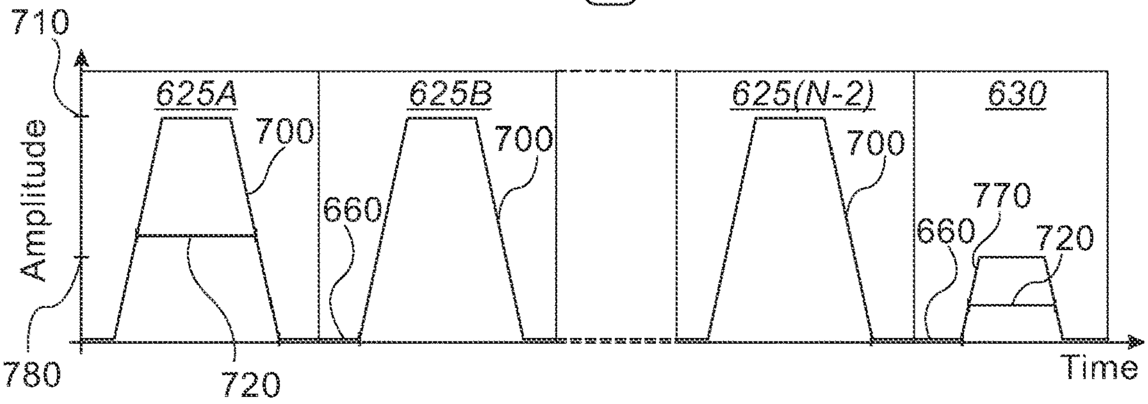
FIG. 3
| Section>> | 1 | 2 | 3 |
|---|---|---|---|
| Level 0 | ☐ | ☐ | ☑ |
| Level 1 | ☑ | ☐ | ☐ |
| Level 2 | ☑ | ☑ | ☐ |
| Level 3 | ☑ | ☑ | ☑ |
800
FIG. 4
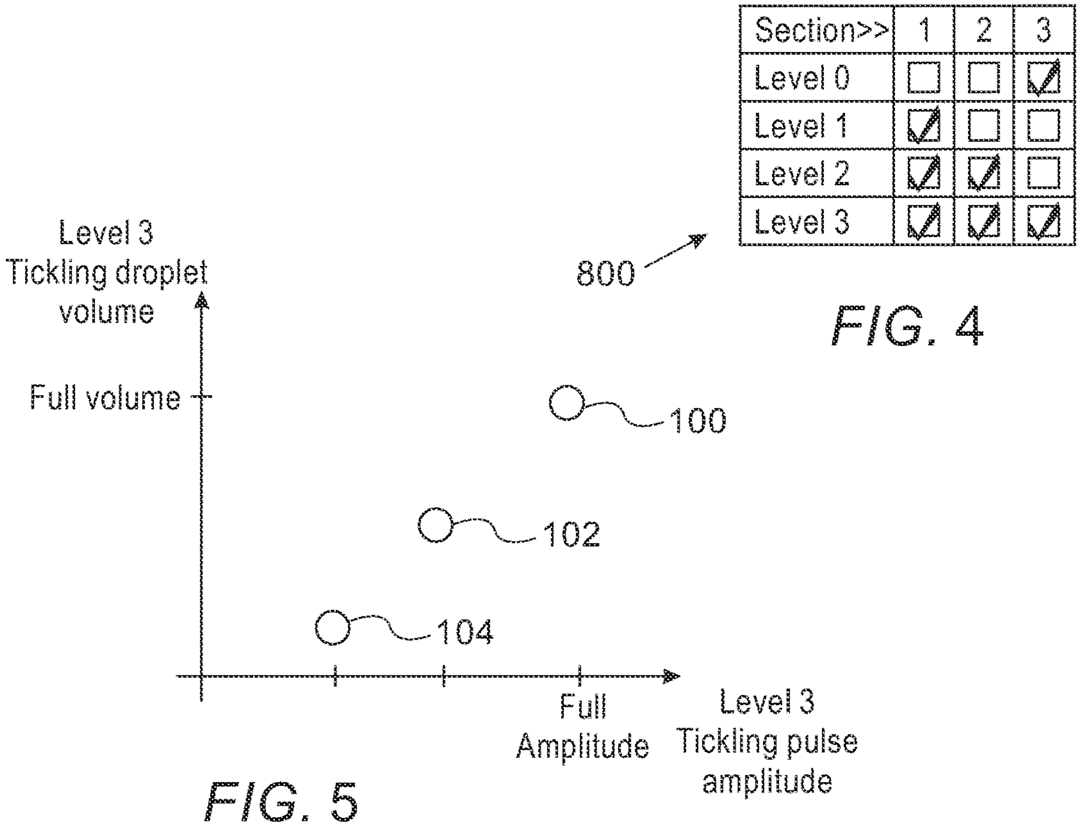
FIG. 5

PULSE WAVEFORMS FOR INK JET PRINTING

CROSS-REFERENCE TO RELATED APPLICATIONS

This application is a division of U.S. patent application Ser. No. 17/706,636 filed Mar. 29, 2022, which is a continuation of U.S. patent application Ser. No. 17/291,630, filed May 6, 2021, in the U.S. National Phase of PCT Application PCT/IB2019/056888, filed Aug. 14, 2019, which claims the benefit of U.S. Provisional Patent Application No. 62/767,533, filed Nov. 15, 2018. The disclosures of all these related applications are incorporated herein by reference.

FIELD OF THE INVENTION

The present invention relates generally to digital printing, and particularly to methods and systems for driving inkjet print heads.

BACKGROUND OF THE INVENTION

Various methods for jetting ink for presses are known in the art. For example, U.S. Patent Application Publication 2006/0164450 describes a method of driving an inkjet module having a plurality of ink jets. The method includes applying a voltage waveform to the inkjet module, the voltage waveform including a first pulse and a second pulse, activating one or more of the ink jets contemporaneously to applying the first pulse, wherein each activated ink jet ejects a fluid droplet in response to the first pulse, and activating all of the ink jets contemporaneously to applying the second pulse without ejecting a droplet.

As another example, U.S. Patent Application Publication 2007/0057979 describes a method and system for facilitating development of fluids having a variety of elemental compositions. A graphical user interface allows user interaction with a lab deposition system to control fluid drop ejection of fluids through multiple nozzles. Fluid drop ejection and drop formation can vary from fluid to fluid, and require adjustments to waveform parameters of a drive pulse applied to the multiple nozzles. The system implements a drop watcher camera system to capture real-time still and video images of fluid drops as they exit the multiple nozzles. The captured drop formation of the fluid drops is displayed to the user. Based on the images, the waveform parameters are adjusted and customized specific for individual fluid. In addition to adjusting the drive pulse that effects fluid drop ejection, a tickle pulse can also be adjusted and customize to prevent clogging of the nozzles.

U.S. Pat. No. 9,272,511 describes a method, apparatus, and system for driving a droplet ejection device with multi-pulse waveforms. In one embodiment, a method for driving a droplet ejection device having an actuator includes applying a multi-pulse waveform with a drop-firing portion having at least one drive pulse and a non-drop-firing portion to an actuator of the droplet ejection device. The non-drop-firing portion includes a jet straightening edge having a droplet straightening function and at least one cancellation edge having an energy canceling function. The drive pulse causes the droplet ejection device to eject a droplet of a fluid.

U.S. Pat. No. 7,988,247 describes a method for causing ink to be ejected from an ink chamber of an ink jet printer includes causing a first bolus of ink to be extruded from the ink chamber; and following lapse of a selected interval, causing a second bolus of ink to be extruded from the ink chamber. The interval is selected to be greater than the reciprocal of the fundamental resonant frequency of the chamber, and such that the first bolus remains in contact with ink in the ink chamber at the time that the second bolus is extruded.

SUMMARY OF THE INVENTION

An embodiment of the present invention provides a digital printing system including a print head and a processor. The print head is configured to jet droplets of ink. The a processor is further configured to translate a required shade of a color, to be printed at a given location on a substrate by the print head, into a sequence of pulses, the sequence including: (a) up to a predefined maximum number of driving pulses that cause the print head to jet respective droplets, and (b) a tickling pulse, which has a smaller amplitude than the driving pulses and which causes the print head to jet a droplet smaller than the droplets jetted in response to the driving pulses. The processor is additionally configured to apply the sequence of pulses to the print head.

In some embodiments, the processor is configured to set a same time duration for the driving pulses and for the tickling pulse.

In some embodiments, the processor is configured to set, for at least one of the pulses in the sequence, a time duration that matches a resonance frequency of a pressure wave in the ink inside a jetting channel of the print head.

In an embodiment, the processor is configured to set the time duration depending on a type of the ink. In another embodiment, the processor is configured to set an amplitude of the driving pulses to achieve a maximal speed of the jetted droplets.

In some embodiments, the processor is configured to apply the tickling pulse at an end of the sequence.

There is additionally provided, in accordance with an embodiment of the present invention, a digital printing method, including defining a required shade of a color, to be printed at a given location on a substrate by a print head that jets droplets of ink. The required shade of the color is translated into a sequence of pulses, the sequence including: (a) up to a predefined maximum number of driving pulses that cause the print head to jet respective droplets, and (b) a tickling pulse, which has a smaller amplitude than the driving pulses and which causes the print head to jet a droplet smaller than the droplets jetted in response to the driving pulses. The sequence of pulses is applied to the print head.

There is further provided, in accordance with an embodiment of the present invention, a manufacturing method, including, in a digital printing system that applies a sequence of pulses to a print head for jetting droplets of ink, calculating time durations, to be assigned to the pulses, so as to match a resonance frequency of a pressure wave in the ink inside a jetting channel of the print head. The digital printing system is configured to apply the calculated time durations.

The present invention will be more fully understood from the following detailed description of the embodiments thereof, taken together with the drawings in which:

BRIEF DESCRIPTION OF THE DRAWINGS

FIG. 2 is a schematic pictorial illustration of a print bar of the digital printing system of FIG. 1, in accordance with an embodiment of the present invention;

FIG. 3 is a diagram showing a waveform applied to a print head during a jetting cycle, in accordance with embodiments of the present invention;

FIG. 4 is a lookup table of a four-shade-level printing scheme, in accordance with an embodiment of the present invention; and FIG. 5 is a schematic graph of level 3 tickling droplet volume as a function of tickling pulse amplitude, in accordance with embodiments of the present invention.

DETAILED DESCRIPTION OF EMBODIMENTS

Overview

Figure 1:
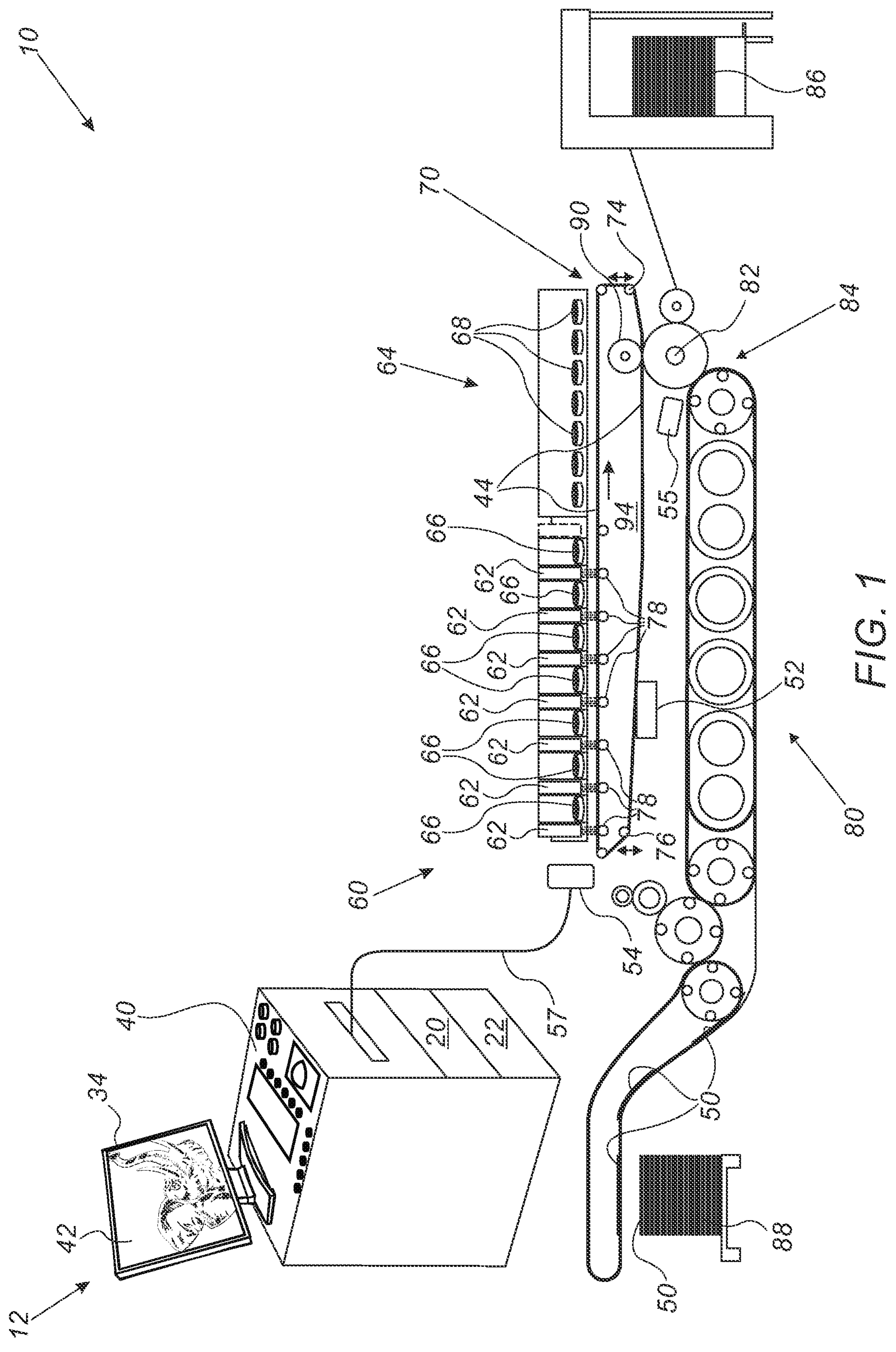
FIG. 1 is a schematic side view of a digital printing system, in accordance with an embodiment of the present invention.

In digital printing, a required shade of a color can be printed at a given location on a substrate (i.e., a printed pixel) by a print head that jets a suitable number of ink droplets of the same color. The print head jets each ink droplet from a nozzle in response to a driving pulse. Therefore, a required shade may be achieved by applying, during a jetting cycle, a suitable number of similar driving pulses to the print head. In the present context, the term "similar" means deviations of up to several percent, e.g., ±10% or ±5%.

During a typical printing session, some nozzles receive driving pulses that cause the nozzles to eject droplets, while other nozzles are temporarily idle. Nozzles that do not eject droplets, and the ink meniscus in them, are exposed to hot environment and may tend to dry out. When the ink starts to dry or increase its viscosity, the nozzle will not fire the first droplets until new ink arrives at the meniscus. As a result, some pixels may be missed, and when the nozzle finally jets, a resulting pixel might be distorted (i.e., have bad straightness). In extreme cases a nozzle that was idle might even clog. To prevent the above described "first drop problem" or latency problem, as well as clogging, a "tickling" pulse may be applied at the end of the jetting cycle, causing ink to flow inside the nozzle but without the nozzle jetting a droplet.

The duration of a jetting cycle is typically fixed and shared among all nozzles. This duration is determined by the number of ink droplets required to produce the darkest shade, and is the sum of the section durations of the driving pulse plus an identical section duration of the tickling pulse. In the present context, a "section" means a pulse and idle time intervals immediately before and/or after the pulse. Thus, a duration of a jetting cycle is fixed, regardless of whether a nozzle was idle at a certain location during a jetting cycle.

Embodiments of the present invention that are described hereinbelow provide methods and systems for increasing printing throughput by using the tickling section (the time duration used for the tickling pulse) in a jetting cycle to jet an ink droplet, and thereby reduce the overall duration of the jetting cycle (i.e., the time required to print the darkest shade). The disclosed technique thus uses a tickling pulse to serve two purposes at the same time: Jetting a droplet, and protecting against ink viscosity increase in the nozzle. Because of the disclosed dual role of the tickling pulses, the jetting cycle can be shortened and the overall printing throughput can be increased.

In some embodiments, for a given location at which a required shade is to be printed, a processor controls electrical circuitry, which in turn controls the print head, to translate the required shade into a sequence of pulses. The sequence comprises up to a predefined maximum number of driving pulses that cause the print head to jet respective droplets, and a tickling pulse that in some settings, as described below, causes the print head to jet a droplet of somewhat smaller volume than the droplets jetted in response to the driving pulses. The processor is further configured to apply the sequence of pulses to the print head.

In another embodiment, during or after assembly of the printing system, a professional adjusts and presets a same duration for all sections, by presetting a same delay between every two successive pulses and presetting all the pulses to the same pulse width. The pulse width and the delay values are selected so that together the duration of a driving section matches a resonance frequency of a pressure wave in the ink inside a jetting channel of the print head (i.e., matching a fluidic-structural resonance of the jetting channel of the print head) for the ink being used. As a result of pressure building up in the jetting channel by one or more driving pulses, the tickling pulse, while having smaller amplitude than the driving pulses, still causes the print head to jet a droplet, which has sufficient volume to produce a required shade.

In an embodiment, before, during or after assembly of the printing system, a professional adjusts and presets the amplitude of the driving pulses to achieve a maximal speed of the jetted droplets.

In example embodiments of the present invention, the printing system prints in a four-shade scheme, in which the system applies up to four shades (e.g., white, light gray, dark gray, and black). In these embodiments, each jetting cycle comprises two driving pulse sections followed by a tickling pulse section, in order to produce the four shades. Applying a tickling pulse capable of jetting an ink droplet at the last section of a jetting cycle, wherein using such tickling pulse, the printing system is configured to produce the darkest shade among the possible shades (e.g., a black shade), shortens the printing time by about a quarter, as described below, achieving a corresponding increase in printing throughput.

In an embodiment, upon receiving a tickling pulse at the end of a jetting cycle, from the electrical circuitry that controls the print heads, the print head causes ink motion in a nozzle of the print head. In an embodiment, in order for a print head to jet an ink droplet in response to tickling pulse, the tickling pulse has to be applied after applying at least one adjacent driving pulse. In general, depending on the applied sequence of driving pulses, and depending on whether any driving pulse is applied in the section immediately preceding the section in which the tickling pulse is applied, the print head may or may not jet an ink droplet in response to the tickling pulse, as described below.

In some embodiments, by adjusting the volume of an ink droplet jetted by a tickling pulse, the disclosed technique achieves improved printing quality over long unsupported segments of substrate, as described below.

By enabling jetting an ink droplet during a tickling section, the disclosed technique improves the throughput of digital printing systems, and reduce the cost of the printing hardware, and thus reduce the overall costs of printing.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms “blanket” and “intermediate transfer member (ITM)” are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as “an ink image” (not shown), of a digital image 42 on an upper run of a surface of blanket 44. Subsequently the ink image is transferred to a target substrate, (e.g., a paper, a folding carton, or any suitable flexible package in a form of sheets or continuous web) located under a lower run of blanket 44.

In the context of the present invention, the term “run” refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application No. 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis of blanket 44, represented by an arrow 94. In this configuration, accurate spacing between bars 62, and synchronization between directing the droplets of the ink of each bar 62 and moving blanket 44 are essential for enabling correct placement of the image pattern.

In the context of the present disclosure and in the claims, the terms “inter-color pattern placement,” “pattern placement accuracy,” color-to-color registration,” “C2C registration” “bar to bar registration,” and “color registration” are used interchangeably and refer to any placement accuracy of two or more colors relative to one another.

In some embodiments, system 10 comprises heaters, such as hot gas or air blowers 66, which are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises a drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller.

Additionally or alternatively, blanket 44 may comprise an integrated encoder (not shown) for controlling the operation of various modules of system 10. The integrated encoder is described in detail, for example, in U.S. Provisional Application No. 62/689,852, whose disclosure is incorporated herein by reference.

In some embodiments, blanket 44 is guided over rollers 76 and 78 and a powered tensioning roller, also referred to herein as a dancer 74. Dancer 74 is configured to control the length of slack in blanket 44 and its movement is schematically represented by a double-sided arrow. Furthermore, any stretching of blanket 44 with aging would not affect the ink image placement performance of system 10 and would merely require the taking up of more slack by tensioning dancer 74.

In some embodiments, dancer 74 may be motorized. The configuration and operation of rollers 76 and 78, and dancer 74 are described in further detail, for example, in U.S. Patent Application Publication 2017/0008272 and in the above-mentioned PCT International Publication WO 2013/132424, whose disclosures are all incorporated herein by reference.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80 located below blanket module 70.

In some embodiments, console 12 comprises a processor 20, typically a general-purpose computer, with suitable front end and interface circuits for interfacing with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and various types of test patterns (described in detail below) stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52 the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket. In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied by jetting, prior to the ink jetting at the image forming station.

In the example of FIG. 1, station 52 is mounted between roller 78 and roller 76, yet, station 52 may be mounted adjacent to blanket 44 at any other suitable location between impression station 84 and image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two impression cylinders so as to permit duplex printing. This configuration also enables conducting single sided prints at twice the speed of printing double sided prints. In addition, mixed lots of single and double-sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application No. 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancers, so as to maintain the upper run taut and to substantially isolate the upper run of blanket 44 from being affected by any mechanical vibrations occurred in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprise any suitable image sensor, such as a Contact Image Sensor (CIS) or a Complementary metal oxide semiconductor (CMOS) image sensor, and a scanner comprising a slit having a width of about one meter or any other suitable width.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10.

In some embodiments, station 55 is configured to inspect the quality of the printed images and test pattern so as to monitor various attributes, such as but not limited to full image registration with sheet 50, color-to-color registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, by acquiring images of the testing marks printed at the bevels of sheet 50, station 55 is configured to measure various types of distortions, such as C2C registration, image-to-substrate registration, different width between colors referred to herein as "bar to bar width delta" or as "color to color width difference", various types of local distortions, and front-to-back registration errors (in duplex printing). In some embodiments, processor 20 is configured to: (i) sort out, e.g., to a rejection tray (not shown), sheets 50 having a distortion above a first predefined set of thresholds, (ii) initiate corrective actions for sheets 50 having a distortion above a second, lower, predefined set of thresholds, and (iii) output sheets 50 having minor distortions, e.g., below the second set of thresholds, to output stack 88.

In some embodiments, processor 20 is further configured to detect, e.g., by analyzing a pattern of the printed inspection marks, additional geometric distortion such as scaling up or down, skew, or a wave distortion formed in at least one of an axis parallel to and an axis orthogonal to the movement axis of blanket 44.

In some embodiments, processor 20 is configured to analyze the signals acquired by station 55 so as to monitor the nozzles of image forming station 60. By printing a test pattern of each color of station 60, processor 20 is configured to identify various types of defects indicative of malfunctions in the operation of the respective nozzles.

For example, absence of ink in a designated location in the test pattern is indicative of a missing or blocked nozzle. A shift of a printed pattern (relative to the original design) is indicative of inaccurate positioning of a respective print bar 62 or of one or more nozzles of the respective print bar. Non-uniform thickness of a printed feature of the test pattern is indicative of width differences between respective print bars 62, referred to above as bar to bar width delta.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continues the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

In some embodiments, the print heads are configured to jet, during the various jetting cycles, a varying number of ink droplets of a same shade onto a same location over blanket 44, so as to form various shades of a same color (e.g., a gray level image). The ink droplets are jetted responsively to driving pulses received from image forming station 60, as instructed by a processor, such as processor 20.

In an embodiment, upon receiving a tickling pulse at the end of a jetting cycle, from electrical circuitry (not shown) that controls each print head, the print head causes ink motion in a nozzle of the print head. Depending on the values of the pulse width and the delay between driving pulses, and depending on whether or not a driving pulse is applied in the section immediately preceding the section in which the tickling pulse is applied, the print head may or may not jet an ink droplet in response to the tickling pulse, as described below.

In the context of the present invention and in the claims, the term "processor" refers to any processing unit, or controller, such as processor 20 or any other processor or controller in system 10, connected to or integrated with image forming station 60, which is configured to, for example, read a look-up table for applying waveforms, which is stored in a memory, and instruct print heads, directly or indirectly, to inkjet accordingly. Note that the control-related instructions and other computational operations described herein may be carried out by a single processor, or shared between multiple processors of one or more respective computers.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Ink Jet Printing with Joint Jetting-Tickling Waveforms

FIG. 2 is a schematic pictorial illustration of a print bar 62 of digital printing system 10 of FIG. 1, in accordance with an embodiment of the present invention. As noted above, print bar 62 comprises a strip, whose width corresponds to that of the printing area on blanket 44, of print heads 622, and further comprises individually controllable print nozzles 624. Print bar 62 is part of an array of print bars which may be included in image forming station 60, as described in FIG. 1.

As seen, each print head comprises a jetting channel 626 filled with an ink 621. In response to a pulse, a membrane in the print head (not seen) drives a pressure wave that propagates in ink 621 along jetting channel 626. In an embodiment, to enable a tickling pulse causing jetting an ink droplet, the timings of pulse-rise and pulse-fall of the pulses are adjusted to resonantly amplify the pressure wave inside jetting channel 626 to get maximum pressure at nozzle 624 exit. The resonance is basically a fluidic (e.g., acoustic) resonance that depends primarily on speed of sound in ink 621 and on channel length 628.

FIG. 3 is a diagram showing a waveform applied to a print head 622 during a jetting cycle, in accordance with embodiments of the present invention. The waveform is applied by a controlling electrical circuitry, as commanded by the processor. In some embodiments, the waveform comprises a number of (N−2) sections for driving pulses: 625A, 625B . . . , 625(N−2), and additionally, a tickling pulse section 630, which together can produce up to N shades of a same color (e.g., N shades of gray).

In some embodiments, such as with the four-shade scheme described above, there are N=2 sections for driving pulses, plus a section dedicated for a tickling pulse, for achieving a total of N=4 shades.

As seen in FIG. 3, each driving pulse section 625 comprises a driving pulse 700 having an amplitude 710 and width 720 (i.e., duration 720) and a delay 660 between successive drive pulses. Tickling pulse section 630 comprises a tickling pulse 770 having amplitude 780 smaller than amplitude 770, and a same width 720 and a same delay 660 relative to the last driving pulse shown (i.e., in section 625(N−2)). In the present example, although not necessarily, a pulse width is defined as the full width at half the maximum of the pulse amplitude.

The smaller amplitude 780 tickling pulse 770 (i.e., smaller than the driving pulse amplitude 710) results in a droplet jetted by a tickling pulse being somewhat smaller than the droplets jetted in response to the driving pulses, as described in FIG. 5. (provided a driving pulse was applied just before tickling pulse 770 was activated).

A driving pulse 700 typically causes a membrane inside print head 622 to push (i.e., jet) an ink droplet through an inkjet nozzle 624 of the print head. The delay 660 and the pulse width 720 match together a resonance frequency of a pressure wave in the ink inside a jetting channel of the print for a given ink. Using the joint printing and tickling technique with the delay and the width of driving pulses preset to match the resonance of the print head results, in case of a four-shade printing cycle, in a total duration of a printing cycle that is reduced by about a quarter, as the number of sections in a jetting cycle drops from four to three.

The jetting cycle waveform shown in FIG. 3 is provided by way of example, purely for the sake of clarity. Any other suitable waveforms can be used in alternative embodiments. For example, the shapes of the pulses may differ from the illustrated trapezoid shapes.

FIG. 4 is a lookup table 800 of a four-shade-level printing scheme, in accordance with an embodiment of the present invention. The scheme coded in lookup table 800 comprises two driving sections (denoted "1" and "2" in the figure) followed by a tickling section (denoted "3"). Table 800 is stored in memory 22 and used by the processor during a printing session. An unchecked section in table 800 results in an idle command by the processor to image forming station 60. A section that is checked causes the processor to instruct image forming module 60 to apply the corresponding pulse at the checked section to a given print head, as described in FIG. 3.

The vertical axis of table 800 provides the four possible shade levels, in which, using printing in black and white as an example, level 0 means no shade (white), level 1 means light gray, level 2 means dark gray, and level 3 means black.

When a location over blanket 44 is specified as white, the processor reads the level 0 line for printing head instructions during a jetting cycle, and correspondingly the printing head applies only a tickling pulse, which does not cause jetting of an ink droplet at the location. If the location is specified as light gray, then the processor reads the level 1 line, in which a single driving pulse is applied to jet a single droplet of ink. Typically, section one is looked up for applying a light gray. Alternatively, section two can be used for this purpose.

If dark gray is specified at the location over blanket 44, then the processor reads the level 2 line, in which two successive driving pulses are applied, with the second pulse jetting a droplet of ink that overlaps the first droplet injected in section one.

If black is specified at the location, the processor reads the level 3 line, and applies tickling pulse 770 after applying two successive driving pulses 700, with the tickling pulse jetting a droplet of ink as described above, which overlaps the first and second droplets ejected, each responsively, to the driving pulses.

The description of look up table 800 of FIG. 4, in terms of black and white printing, is brought by way of example. In other embodiments, lookup table 800 may be implemented in the same or similar manner for color printing. Further alternatively, the use of a look-up table is not mandatory. The processor may use any other suitable data structure or format for storing the waveform definitions for the various shades.

A tickling pulse will cause jetting of an ink droplet only in level 3, in which the previous pulse (i.e., section 2) is active. This is because, as noted above, the previous pulse energizes (due to being in sync with a resonance frequency of a pressure wave in the ink inside a jetting channel of print head) the ink inside the nozzle. Thus, at level 0 the tickling pulse always does not cause jetting of an ink droplet. If there is no previous pulse (as the case in level 1), a tickling pulse applied at level 1 (this embodiment not reflected by table 800) will only agitate the meniscus without jetting.

FIG. 5 is a schematic graph of the volume of a tickling droplet as a function of level 3 tickling pulse amplitude, in accordance with embodiments of the present invention. FIG. 5 shows an approximately linear dependence of the volume of the tickling droplet as a function of the amplitude of tickling pulse 770. Data point 100 describes a tickling pulse 770 that is practically identical to a driving pulse 700, with a resulting droplet volume similar to that of a droplet jetted by a driving pulse, when applied as a third pulse, e.g., in level 3 of FIG. 4.

Note that applying a third pulse in full amplitude in level 0, however, will result in jetting ink, which is not intended.

Data point 102 describes an optimized tickling pulse 770 that causes the jetting of an exact droplet volume to achieve the level 3 shade, such as black Data point 104 describes a tickling pulse 770 that causes the jetting of a droplet having a minimal volume, which results in an intermediate shade, for example, darker than dark gray and paler than black in a four-shade scheme. However, in this case the level 3 ink volume (i.e., including a resulting droplet volume from pulse amplitude of data point 104) is not large enough to produce the maximal shade as required.

Any pulse amplitude below that applied in data point 104 would only cause some motion of the ink inside the nozzle, without jetting any. In an embodiment, the pulse amplitude in data point 104 is about a third of the full amplitude of a driving pulse that is represented by data point 100.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A digital printing system, comprising:

a print head, configured to jet droplets of ink; and a processor, which is configured to:

translate a required shade of a color, to be printed at a given location on a substrate by the print head, into a sequence of one or more pulses, wherein for at least one shade, the sequence of one or more pulses comprises:

up to a predefined maximum number of driving pulses that cause the print head to jet respective droplets; and a tickling pulse, which has a smaller amplitude than the driving pulses and is such that when the tickling pulse is applied just after a driving pulse, it causes the print head to jet a droplet, while if the tickling pulse is applied not just after a driving pulse, it does not cause the print head to jet a droplet; and apply the sequence of pulses to the print head.

2. The system according to claim 1, wherein a time duration of at least one of the driving pulses in the sequence of one or more pulses matches a resonance frequency of a pressure wave in the ink inside a jetting channel of the print head.

3. The system according to claim 2, wherein the time duration of the at least one of the driving pulses is set depending on a type of the ink.

4. The system according to claim 1, wherein the processor is configured to set an amplitude of the driving pulses to achieve a maximal speed of the jetted droplets.

5. The system according to claim 1, wherein the tickling pulse is at an end of the sequence for the at least one shade.

6. The system according to claim 1, wherein the driving pulses and the tickling pulse have a same duration.

7. The system according to claim 1, wherein the tickling pulse has an amplitude which when applied just after a driving pulse, causes the print head to jet a droplet smaller than the droplets jetted in response to the driving pulses.

8. The system according to claim 1, wherein the processor is configured to convert a plurality of different required shades into respective pulse sequences, the pulse sequences all having a same duration defining a given number of sections in which pulses may be applied and each shade has a corresponding pulse sequence with a different combination of the sections in which pulses are applied.

9. The system according to claim 8, wherein the given number of sections includes driving pulse sections which include driving pulses in respective pulse sequences of corresponding to one or more of the shades, and a tickling pulse section, which includes a tickling pulse in respective pulse sequences corresponding to a plurality of the shades.

10. The system according to claim 9, wherein the tickling pulse section includes a tickling pulse only in the respective pulse sequences of a brightest shade and a darkest shade.

11. A digital printing method, comprising:

defining a required shade of a color, to be printed at a given location on a substrate by a print head that jets droplets of ink;

translating the required shade of the color into a sequence of one or more pulses, and applying the sequence of pulses to the print head, wherein the sequence of pulses for at least one shade comprises:

up to a predefined maximum number of driving pulses that cause the print head to jet respective droplets; and a tickling pulse, which has a smaller amplitude than the driving pulses and is such that when it is applied just after a driving pulse it causes the print head to jet a droplet, while if the tickling pulse is applied not just after a driving pulse, it does not cause the print head to jet a droplet.

12. The method according to claim 11, wherein translating the required shade into the sequence of pulses comprises setting, for at least one of the pulses in the sequence of pulses, a time duration that matches a resonance frequency of a pressure wave in the ink inside a jetting channel of the print head.

13. The method according to claim 11, wherein the tickling pulse has an amplitude which when applied just after a driving pulse, causes the print head to jet a droplet smaller than the droplets jetted in response to the driving pulses.

14. The method according to claim 11, and comprising setting an amplitude of the driving pulses to achieve a maximal speed of the jetted droplets.

15. The method according to claim 11, wherein applying the sequence of pulses comprises applying the tickling pulse at an end of the sequence of pulses.

* * * * *